(12) United States Patent
He et al.

(10) Patent No.: US 11,014,312 B2
(45) Date of Patent: May 25, 2021

(54) SILICONE COLD-EXTRUSION LAMP BELT AND MANUFACTURING METHOD THEREOF

(71) Applicant: Shenzhen Thousandshores Technology Co., Ltd., Guangdong (CN)

(72) Inventors: Ding He, Guangdong (CN); Lei Zhou, Guangdong (CN)

(73) Assignee: Shenzhen Thousandshores Technology Co., Ltd., Shenzhen (CN)

( * ) Notice: Subject to any disclaimer, the term of this patent is extended or adjusted under 35 U.S.C. 154(b) by 644 days.

(21) Appl. No.: 15/742,096

(22) PCT Filed: Aug. 2, 2017

(86) PCT No.: PCT/CN2017/095698
§ 371 (c)(1),
(2) Date: Jan. 5, 2018

(87) PCT Pub. No.: WO2019/024020
PCT Pub. Date: Feb. 7, 2019

(65) Prior Publication Data
US 2019/0070794 A1    Mar. 7, 2019

(51) Int. Cl.
*B29C 67/00* (2017.01)
*B29C 48/154* (2019.01)
*B29C 48/00* (2019.01)
*B29C 48/92* (2019.01)
*B29C 48/08* (2019.01)
*B29C 48/07* (2019.01)
(Continued)

(52) U.S. Cl.
CPC ...... *B29C 67/0029* (2013.01); *B29C 48/0022* (2019.02); *B29C 48/07* (2019.02); *B29C 48/08* (2019.02); *B29C 48/154* (2019.02); *B29C 48/92* (2019.02); *C04B 35/56* (2013.01); *B29D 7/00* (2013.01); *B29K 2883/00* (2013.01); *B29L 2031/36* (2013.01); *B29L 2031/747* (2013.01); *F21K 9/90* (2013.01)

(58) Field of Classification Search
None
See application file for complete search history.

(56) References Cited

U.S. PATENT DOCUMENTS

| | | | | |
|---|---|---|---|---|
| 4,355,121 | A * | 10/1982 | Evans | C08G 77/24 522/99 |
| 7,213,941 | B2 * | 5/2007 | Sloan | F21V 21/005 362/20 |
| 2012/0170258 | A1 * | 7/2012 | VanDuinen | F21V 19/0045 362/217.02 |

* cited by examiner

Primary Examiner — Monica A Huson
Assistant Examiner — Kelsey C Grace

(57) ABSTRACT

Disclosed are a new silicone cold-extrusion lamp belt and its manufacturing method. The manufacturing method includes the following steps. S10: Select a PCB and use the PCB as a substrate. S20: Set LED lamp bead spot-welding units arranged in an array formed on the substrate to obtain a target board. S30: Extrude a slurry which is formed by a food-grade silicone and coat the slurry on an outer surface of the target board to form a lamp skin. S40: Cut the target board into at least one lamp belt substrate. S50: Heat and bake the lamp belt substrate to obtain a lamp belt. This disclosure has the advantages of feasible design, low manufacturing cost, high resistance on cracking, wearing, yellowing, high/low temperature, good fire resistance, environmental friendly and harmless to human safety, high transparency, high light emitting efficiency of the lamp, and applicable for indoor/outdoor lamp belts.

8 Claims, 3 Drawing Sheets

(51) Int. Cl.
*C04B 35/56* (2006.01)
*B29L 31/36* (2006.01)
*B29L 31/00* (2006.01)
*B29D 7/00* (2006.01)
*F21K 9/90* (2016.01)

SILICONE COLD-EXTRUSION LAMP BELT AND MANUFACTURING METHOD THEREOF

FIELD OF THE INVENTION

The present disclosure relates to the technical field of lamp belts, in particular to a new silicone cold-extrusion lamp belt and its manufacturing method.

BACKGROUND OF THE INVENTION

At present, the skin of a conventional lamp belt is made of two main types of materials, respectively: general industrial silicone and industrial PU plastic. In actual application, the products made of these two materials have the issue of having a short life cycle or an easily cracked or yellowed surface after a long time of use. In addition, most skins of the lamp belt made of these two types of materials generally have the shortcomings of low fire resistance, poor high/low temperature resistance, bad smell, easily flammable PU plastic material, and black smoke produced during combustion. Therefore, the lamp belt products made of the aforementioned two materials have limited flexibility on the appearance of the lamp belt.

Obviously, the conventional lamp belt requires improvements.

SUMMARY OF THE INVENTION

Therefore, it is a primary objective of the present disclosure to overcome the aforementioned drawbacks of the prior art by providing a new silicone cold-extrusion lamp belt and its manufacturing method in accordance with this disclosure.

To achieve the aforementioned and other objectives, the present disclosure provides a manufacturing method of a new silicone cold-extrusion lamp belt, and the manufacturing method comprises the following steps S10~S50:

S10: Select a PCB and use the PCB as a substrate.

S20: Set a plurality of LED lamp bead spot-welding units arranged in an array formed on the substrate to obtain a target board.

S30: Extrude a slurry which is formed by a food-grade silicone and coat the slurry on an outer surface of the target board to form a lamp skin.

S40: Cut the target board into at least one lamp belt substrate.

S50: Heat and bake the lamp belt substrate to obtain a lamp belt.

In an embodiment, the step S30 specifically comprises: cutting the target board into at least one lamp belt substrate according to the row direction or column direction of the target board.

In an embodiment, the step S40 specifically comprises: extruding a slurry formed by a food-grade silicone through a cold extrusion mold and wrapping the slurry into an outer surface of the lamp belt substrate to form a lamp skin.

In an embodiment, the slurry is wrapped into the lamp belt substrate by a semi-wrapped form, so that a lamp belt skin is formed on a surface of the lamp belt; or the slurry is wrapped into the lamp belt substrate in a fully-wrapped form, so that the lamp belt skin is formed on an outer surface of the lamp belt.

In an embodiment, the cold extrusion mold has an extruding opening substantially in a circular shape, a square shape, or any other shape, for extruding and forming a lamp belt skin in a corresponding shape.

In an embodiment, the lamp belt skin has a thickness of 0.5~10 mm.

In an embodiment, the step S50 specifically comprises: putting the lamp belt wrapped with a food-grade silicone into a long baking-tunnel furnace, and heating and baking the lamp belt substrate to obtain the formed lamp belt by means of the long baking-tunnel furnace.

In an embodiment, the step S50 has a heating temperature of 60° C. and a continuous heating time of 2~3 hours, or the step S50 has a heating temperature of 120° C. and a continuous heating time of 10 minutes.

In an embodiment, the step S30 cuts the target board into at least one lamp belt substrate and the step S40 extrudes a slurry formed by a food-grade silicone and coats the slurry onto an outer surface of the lamp belt substrate to form the lamp skin, wherein the manufacturing sequence may be interchanged.

To achieve the aforementioned and other objectives, the present disclosure provides a new silicone cold-extrusion lamp belt manufactured according to the aforementioned manufacturing method.

To achieve the aforementioned and other objectives, the present disclosure further provides a manufacturing method of a new silicone cold-extrusion lamp belt, and the manufacturing method comprises the following steps S10~S50:

S10: Select a PCB and use the PCB as a substrate.

S20: Set a plurality of LED lamp bead spot-welding units arranged in an array formed on the substrate to obtain a target board.

S30: Cut the target board into at least one lamp belt substrate.

S40: Extrude a slurry which is formed by a food-grade silicone and coat the slurry on an outer surface of the target board to form a lamp skin.

S50: Heat and bake the lamp belt substrate to obtain a lamp belt.

In the present disclosure, a PCB is selected as a substrate; LED lamp bead spot-welding units arranged in an array form are set on the substrate to obtain a target board; the target board is cut into at least one lamp belt substrate; and a slurry formed by a food-grade silicone is extruded and coated onto an outer surface of the lamp belt substrate to form a lamp skin; and finally the lamp belt substrate is heated and baked to form a lamp belt. Due to the food-grade silicone, the lamp belt of this disclosure does not deform easily at high temperature and has a high waterproof level, and the lamp belt will not be decomposed into substance which is hazardous to food safety. The lamp belt also has the advantages of high physiological inertness, biological ageing resistance, and mechanical performance. The platinum vulcanization silicone rubber produces a synergy reaction. Unlike the original polycondensation reaction, the silicone rubber has a better intermolecular binding, so that the tensile strength, tear strength, and shrinkage of a silicone tube will be low to improve the resilience significantly. In addition, the lamp belts have the advantages of high resistance of cracking, wearing, yellowing, and high/low temperature, good fire resistance, and environmentally friendly and having no harm to human safety.

BRIEF DESCRIPTION OF THE DRAWINGS

The above and other objects, features and advantages of this disclosure will become apparent from the following detailed description taken with the accompanying drawings. Only some embodiments of the present disclosure have been

The objectives, features, and advantages of the present disclosure are described and illustrated together with the related drawings as follows.

DESCRIPTION OF ILLUSTRATED EMBODIMENTS

It should be understood that the terms used in this specification and claims such as "first" and "second" are provided for the purpose of illustrating this disclosure, but not intended for indicating or implying their relative importance or indicating the quantity of a specific element. Therefore, the characteristic with the limitation of the "first" or "second" may indicate or imply the characteristic of having at least one element. In addition, the technical solutions of different embodiments may be combined, but such combination must be able to be implemented by persons having ordinary skill in the art. Such combination will be considered to be non-existent if it is contradictory or unable to be implemented and is not to be covered in the scope of the present disclosure.

The following description combines the drawings of the embodiments of the present disclosure to clearly and fully describe the technical characteristics of the embodiments of the present disclosure. Obviously, these embodiments just include some of the embodiments only, but not all of the embodiments. Based on the embodiments of the present disclosure, the people having ordinary skill in the art may obtain all other embodiments without any creative labor, and these embodiments are covered by the scope of the present disclosure.

Embodiment 1

Figure 1:
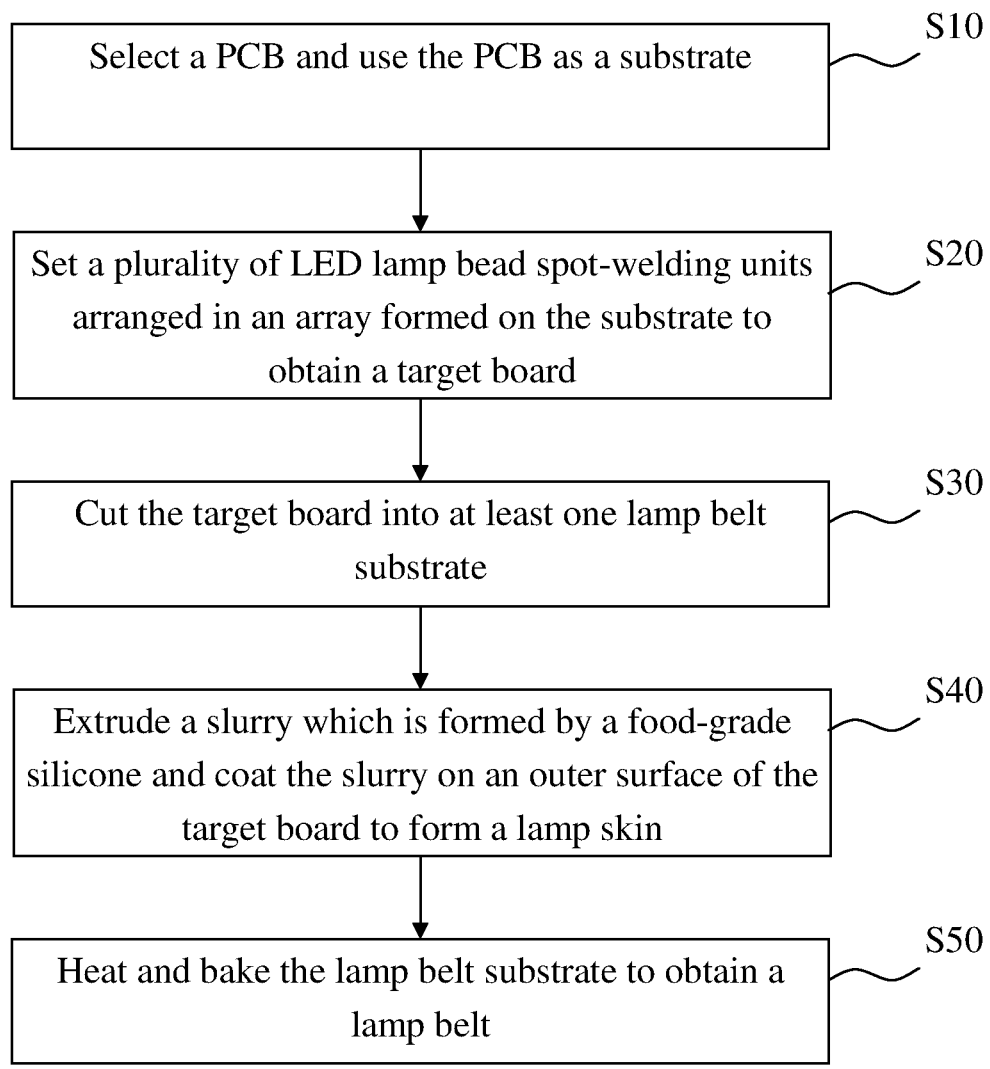
FIG. 1 is a flow chart of a manufacturing method of a new silicone cold-extrusion lamp belt in accordance with an embodiment of the present disclosure.

With reference to FIG. 1 for a manufacturing method of the new silicone cold-extrusion lamp belt in accordance with an embodiment of the present disclosure, the manufacturing method comprises the following steps S10~S50:

S10: Select a PCB and use the PCB as a substrate.

S20: Set a plurality of LED lamp bead spot-welding units arranged in an array formed on the substrate to obtain a target board.

S30: Cut the target board into at least one lamp belt substrate.

S40: Extrude a slurry which is formed by a food-grade silicone and coat the slurry on an outer surface of the target board to form a lamp skin.

S50: Heat and bake the lamp belt substrate to obtain a lamp belt.

In this embodiment, the PCB may be a whole piece of metal board, and the metal board is formed into a plurality of strips of parallel circuits by a circuit etching process. The etching method is a normal etching process, and thus it will not be described in details. A whole piece of a PCB may be cut into a plurality of strips of lamp belt substrates, and the lamp belt substrate comprises a circuit to assure the normal operation of the LED light emitting source. The food-grade silicone is used to make the lamp belt skin. Since the platinum vulcanization silicone rubber has a synergy reaction. Unlike the original polycondensation reaction, the silicone rubber has a better intermolecular binding, so that the tensile strength, tear strength, and shrinkage of a silicone tube will be low to improve the resilience significantly. In addition, the lamp belts have the advantages of high resistance of cracking, wearing, yellowing, and high/low temperature, good fire resistance, and environmentally friendly and having no harm to human safety.

In the present disclosure, a PCB is selected as a substrate; LED lamp bead spot-welding units arranged in an array form are set on the substrate to obtain a target board; the target board is cut into at least one lamp belt substrate; and a slurry formed by a food-grade silicone is extruded and coated onto an outer surface of the lamp belt substrate to form a lamp skin; and finally the lamp belt substrate is heated and baked to form a lamp belt. Due to the food-grade silicone, the lamp belt of this disclosure does not deform easily at high temperature and has a high waterproof level, and the lamp belt will not be decomposed into substance which is hazardous to food safety. The lamp belt also has the advantages of high physiological inertness, biological ageing resistance, and mechanical performance. The platinum vulcanization silicone rubber produces a synergy reaction. Unlike the original polycondensation reaction, the silicone rubber has a better intermolecular binding, so that the tensile strength, tear strength, and shrinkage of a silicone tube will be low to improve the resilience significantly. In addition, the lamp belts have the advantages of high resistance of cracking, wearing, yellowing, and high/low temperature, good fire resistance, and environmentally friendly and having no harm to human safety.

In an embodiment, the step S30 specifically comprises: cutting the target board into at least one lamp belt substrate according to the row direction or column direction of the target board.

In this embodiment, the target board is cut according the user requirement into stripped lamp belt substrates along the row direction or the column direction. Further, the lamp belt substrate may be a flexible printed circuit board (FPCB).

In an embodiment, the Step S40 specifically comprises: extruding a slurry formed by a food-grade silicone through a cold extrusion mold and wrapping the slurry into an outer surface of the lamp belt substrate to form a lamp skin. Further, the slurry is wrapped into the lamp belt substrate by a semi-wrapped form, so that a lamp belt skin is formed on a surface of the lamp belt. In the solution of parallel arrangement, the slurry is wrapped into the lamp belt substrate by a fully-wrapped form, so that the lamp belt skin is formed on the outer surface of the lamp belt. Specifically, the cold extrusion mold has an extruding opening substantially in a circular shape, a square shape, or any other shape, for extruding and forming a lamp belt skin in a corresponding shape.

In this embodiment, the food-grade silicone material is extruded by a cold extrusion mold and coated onto the outer surface of the lamp belt substrate to form the lamp belt skin. The extruding opening of the cold extrusion mold is in a circular shape, a square shape or any other shape, so that the lamp belt skin in the shape corresponding to the circular shape, square shape or any other shape can be formed, and the lamp belt skin can be used for the LED lamp belt products of different sizes.

In an embodiment, the lamp belt skin has a thickness of 0.5~10 mm. Preferably, the thickness of the lamp belt skin is 1~2 mm to meet the ultra-thin design requirement.

In an embodiment, the Step S50 specifically comprises: putting the lamp belt wrapped with a food-grade silicone into a long baking-tunnel furnace, and the long baking-tunnel furnace is provided for heating and baking the lamp belt substrate to obtain the formed lamp belt. Further, the Step S50 has a heating temperature of 60° C. and a continuous heating time of 2~3 hours. Alternatively, the Step S50 has a heating temperature of 120° C. and a continuous heating time of 10 minutes. In the heating, a low-temperature baking may be used, or a higher-temperature heating process may be adopted to shorten the heating time.

Embodiment 2

Figure 2:
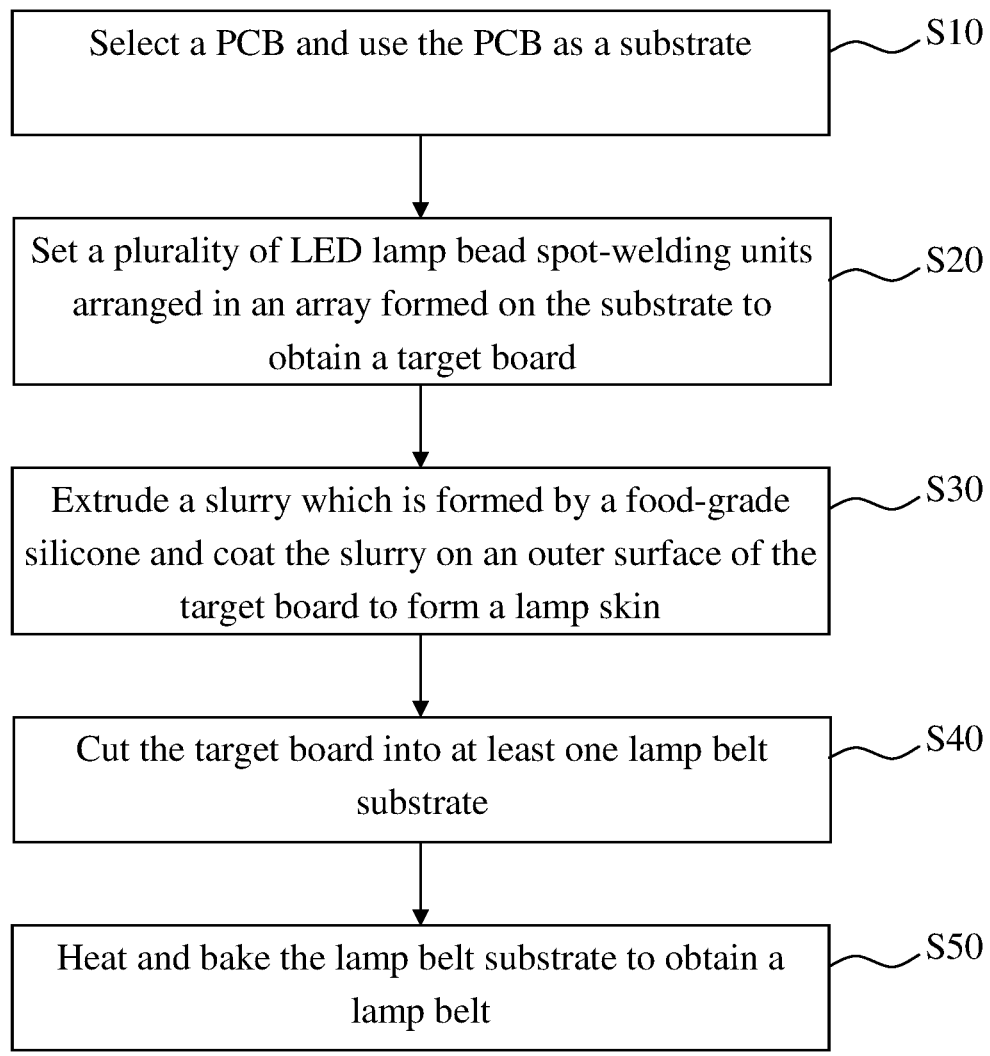
FIG. 2 is a flow chart of a manufacturing method of a new silicone cold-extrusion lamp belt in accordance with another embodiment of the present disclosure.

With reference to FIG. 2 for a manufacturing method of the new silicone cold-extrusion lamp belt in accordance with an embodiment of the present disclosure, the manufacturing method comprises the following steps S10~S50:

S10: Select a PCB and use the PCB as a substrate.

S20: Set a plurality of LED lamp bead spot-welding units arranged in an array formed on the substrate to obtain a target board.

S30: Extrude a slurry which is formed by a food-grade silicone and coat the slurry on an outer surface of the target board to form a lamp skin.

S40: Cut the target board into at least one lamp belt substrate.

S50: Heat and bake the lamp belt substrate to obtain a lamp belt.

Compared with the embodiment 1, the embodiment 2 switches the manufacturing sequence, such as the step of cutting the target board into at least one lamp belt with the step of extruding the slurry and coating the slurry onto the outer surface of the lamp belt substrate, so as to improve the coating efficiency of the target board. Other parameters of the embodiment 2 are the same as those of the embodiment 1, and thus they will not be repeated.

Embodiment 3

Figure 3:
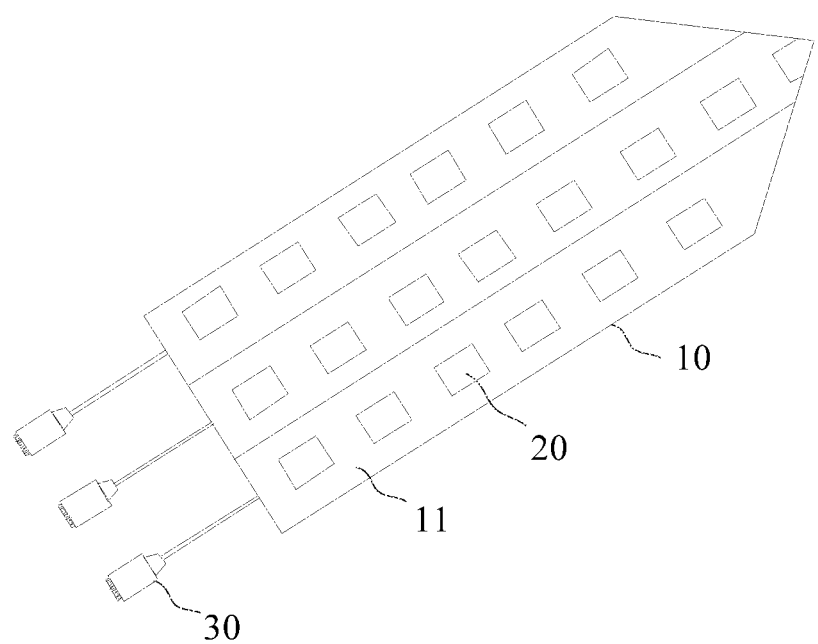
FIG. 3 is a schematic view of a new silicone cold-extrusion lamp belt in accordance with another embodiment of the present disclosure.

With reference to FIG. 3 for a the new silicone cold-extrusion lamp belt manufactured by the manufacturing method in accordance with an embodiment of the present disclosure, the new silicone cold-extrusion lamp belt is manufactured by the aforementioned manufacturing method, so that this disclosure has the advantages of feasible design, simple structure, low manufacturing cost, high resistance on cracking, wearing, yellowing, high/low temperature, good fire resistance, environmental friendly and harmless to human safety, high transparency, high light emitting efficiency of the lamp, and applicable for indoor/outdoor lamp belts. The new silicone cold-extrusion lamp belt specifically includes a lamp belt 10, a plug 30 installed at an end of the lamp belt 10, a lamp belt skin 11 disposed on at least one of the lamp belt 10, and a light emitting source 20 disposed on the lamp belt, wherein the light emitting source 20 is preferably installed on the lamp belt skin 11, so that the lamp belt skin 11 can protect the outer side of the lamp belt 10.

While the disclosure has been described by means of specific embodiments, numerous modifications and variations could be made thereto by those skilled in the art without departing from the scope and spirit of the disclosure set forth in the claims.

What is claimed is:

1. A manufacturing method of a new silicone cold-extrusion lamp belt, comprising the steps of:
   (S10) selecting a PCB and using the PCB as a substrate;
   (S20) setting a plurality of LED lamp bead spot-welding units arranged in an array formed on the substrate to obtain a target board;
   (S30) cutting the target board into at least one lamp belt substrate;
   (S40) extruding a slurry formed by a food-grade silicone and coating the slurry on an outer surface of the lamp belt substrate to form a lamp skin; and
   (S50) heating and baking the lamp belt substrate to obtain a formed lamp belt; wherein the step S50 specifically comprises: putting the lamp belt wrapped with a food-grade silicone into a long baking-tunnel furnace, heating and baking the lamp belt substrate to obtain the formed lamp belt by means of the long baking-tunnel furnace.

2. The manufacturing method of a new silicone cold-extrusion lamp belt according to claim 1, wherein the step S30 specifically comprises: cutting the target board into at least one lamp belt substrate according to the row direction or column direction of the target board.

3. The manufacturing method of a new silicone cold-extrusion lamp belt according to claim 1, wherein the step S40 specifically comprises: extruding a slurry formed by a food-grade silicone through a cold extrusion mold and wrapping the slurry into an outer surface of the lamp belt substrate to form a lamp skin.

4. The manufacturing method of a new silicone cold-extrusion lamp belt according to claim 3, wherein the slurry is wrapped into the lamp belt substrate by a semi-wrapped form, so that a lamp belt skin is formed on a surface of the lamp belt; or the slurry is wrapped into the lamp belt substrate in a fully-wrapped form, so that the lamp belt skin is formed on an outer surface of the lamp belt.

5. The manufacturing method of a new silicone cold-extrusion lamp belt according to claim 3, wherein the cold extrusion mold has an extruding opening substantially in a circular shape, a square shape, or any other shape, for extruding and forming a lamp belt skin in a corresponding shape.

6. The manufacturing method of a new silicone cold-extrusion lamp belt according to claim 3, wherein the lamp belt skin has a thickness of 0.5~10 mm.

7. The manufacturing method of a new silicone cold-extrusion lamp belt according to claim 1, wherein the step S50 has a heating temperature of 60° C. and a continuous heating time of 2~3 hours, or the step S50 has a heating temperature of 120° C. and a continuous heating time of 10 minutes.

8. A manufacturing method of a new silicone cold-extrusion lamp belt, comprising the steps of:
   (S10) selecting a PCB and using the PCB as a substrate;
   (S20) setting a plurality of LED lamp bead spot-welding units arranged in an array formed on the substrate to obtain a target board;
   (S30) extruding a slurry formed by a food-grade silicone and coating the slurry on an outer surface of the target board to form a lamp skin;
   (S40) cutting the target board into at least one lamp belt substrate; and
   (S50) heating and baking the lamp belt substrate to obtain a formed lamp belt wherein the step S50 specifically comprises: putting the lamp belt wrapped with a food-grade silicone into a long baking-tunnel furnace, heating and baking the lamp belt substrate to obtain the formed lamp belt by means of the long baking-tunnel furnace.

\* \* \* \* \*